May 9, 1950
E. J. RIORDAN
2,507,320
ALTERNATING CURRENT ELECTRICAL INSTRUMENT
AND ELECTROMAGNET THEREFOR
Filed March 16, 1948
2 Sheets-Sheet 1
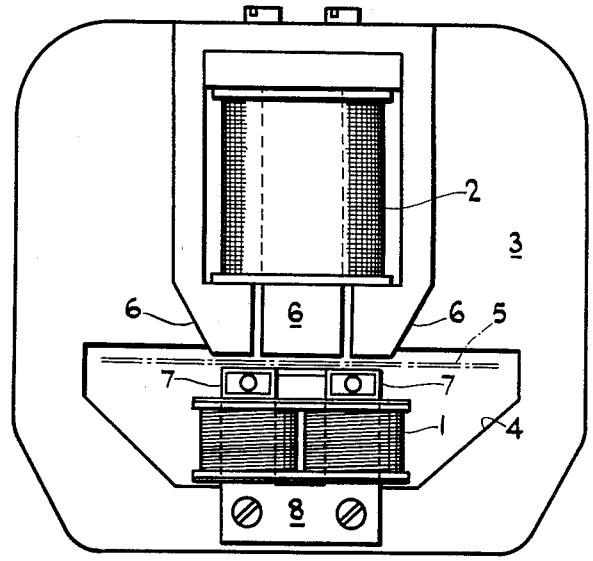
FIG. 1
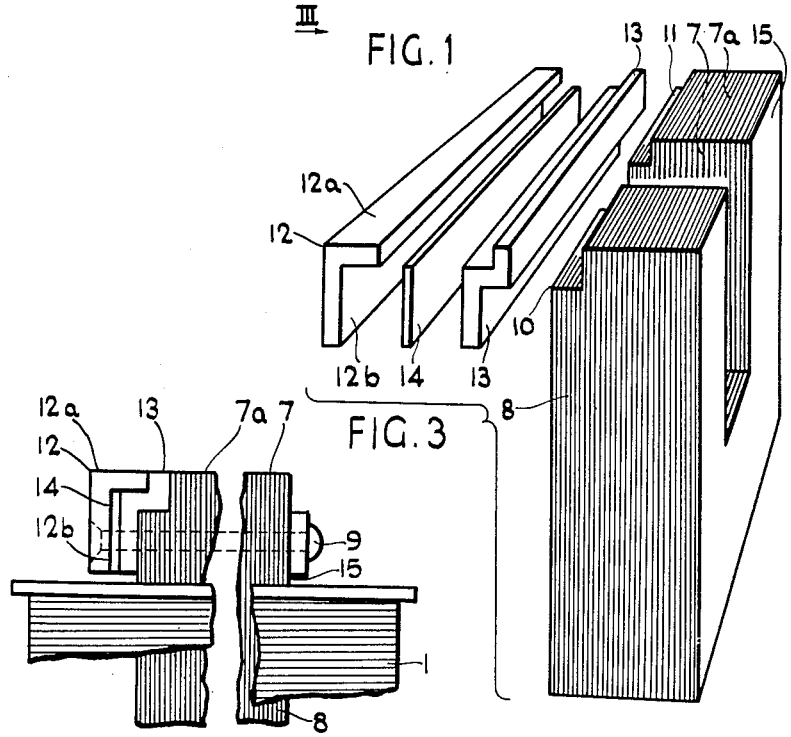
FIG. 3
FIG. 2
INVENTOR.
Edward John Riordan
BY
Peck & Peck
Attorneys May 9, 1950

E. J. RIORDAN 2,507,320

ALTERNATING CURRENT ELECTRICAL INSTRUMENT
AND ELECTROMAGNET THEREFOR

Filed March 16, 1948

INVENTOR.
Edward John Riordan
BY
Peck + Peck
Attorneys

Patented May 9, 1950

2,507,320

UNITED STATES PATENT OFFICE 2,507,320

ALTERNATING CURRENT ELECTRICAL INSTRUMENT AND ELECTROMAGNET THEREFOR

Edward John Riordan, Kilburn, London, England

Application March 16, 1948, Serial No. 15,166
In Great Britain March 21, 1947

3 Claims. (Cl. 171—264)

This invention relates to alternating current electrical instruments of the kind in which a disc placed in proximity to the poles of an electromagnet rotates by reason of eddy currents induced therein, and is directed to series electromagnets adapted for use in such instruments. The invention will be illustratively described in connection with one form of series electro-magnet suitable for use in a single-phase alternating-current watt-hour meter. By the term "series electro-magnet" is meant an electro-magnet the winding of which is connected in series with the load.

An electricity meter of the kind referred to having a series electro-magnet has an error which is not constant but which varies for different loads; in fact the "error/load" curve droops rapidly and appreciably at the higher loads. Various means have been tried to reduce this error or to make it constant: for example, it has been proposed to mount a small bridge of magnetic material across the poles of the series magnet but separated therefrom by a non-magnetic layer.

In a prior construction proposed by the applicant an electrical instrument of the kind described has means, to reduce this error or to make it constant over a greater load range, which consist of a series electro-magnet having a laminated core with a lamination or laminations of non-magnetic material therein positioned close to one face of the magnet (for example separated from the said face by but one magnetic lamination), the said non-magnetic material having preferably an electrical conductivity considerably lower than that of copper. The non-magnetic material being combined with a bridge of magnetic material across the poles of the said core and separated therefrom by a spacer piece of non-magnetic material. The said bridge in this prior construction being of L-shaped cross-section of such size that it becomes saturated at higher loads and is formed with one leg of the L parallel with and fixed to the side face of the magnet core adjacent the non-magnetic lamination and having the other leg of the L parallel with the rotating disc of the meter.

The present invention comprises a modification of that described above whereby the "error/load" curve will be continued as a straight line for a still larger load range. It is somewhat of the kind above described in the said prior construction in that the series electro-magnet has a bridge of magnetic material across the poles of the core which bridge is of L shape. The present invention, however, renders unnecessary the lamination or laminations of non-magnetic material in the laminated core of the magnet.

The present invention comprises, in or for an alternating current electrical instrument of the kind referred to, a series electro-magnet having its pole faces cut away and provide with a bridge of magnetic material extending across the poles and positioned in the cut away portion, the bridge being separated from the material of the magnet by a spacer piece of non-magnetic material.

Preferably the bridge piece is of L-shape with one limb extending down the side faces of the poles and the other limb extending into the cut away portion in the pole faces.

According to a further feature of the invention, the bridge piece is disposed at or towards the sides of the poles of the magnet nearer to the outer edge of the disc of the instrument.

One form of series electro-magnet for an alternating current electrical instrument of the kind referred to and according to the present invention will now be described by way of example with reference to the accompanying drawings in which—

Fig. 1 is an elevation of the electro-magnet assembly of a watt-hour energy meter;

Fig. 2 is a side elevation of the series magnet assembly;

Fig. 3 is an exploded perspective view in the direction of the arrow III of Fig. 1.

Figure 4:
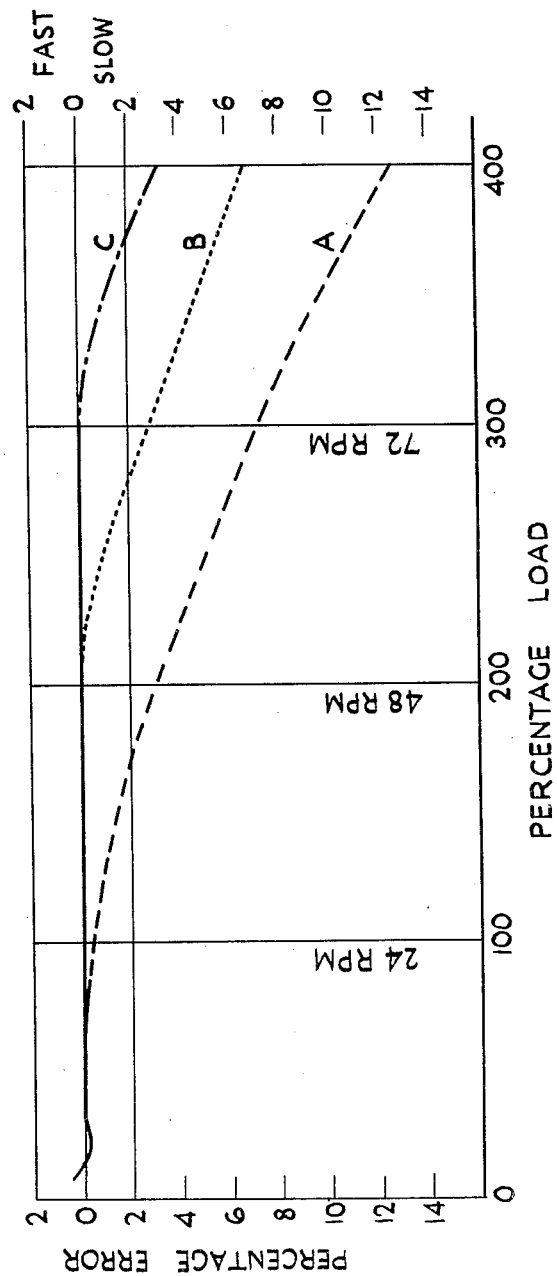
Fig. 4 shows comparative error/load curves, plotted to percentage scales, illustrating the improvements obtained by means of the invention, as applied to a single phase watt-hour meter.

The electro-magnet 1, illustrated in Figs. 1–3 of the drawings, is suitable for use as the series electro-magnet of a single-phase watt-hour meter and will be described in connection with such an instrument. The shunt electro-magnet 2, of the instrument and the series electro-magnet 1 are both mounted on a plate 3 of magnetic material which has a part cut away to form an aperture 4 through which the rotating disc 5 of the meter projects, said disc lying in a plane between the poles 6 of the shunt magnet 2 and the poles 7 of the series magnet 1.

The core 8 of the series electro-magnet 1 is built up from laminations of magnetic iron or steel in the usual way, which laminations are clamped together by rivets 9. The faces 7a of the poles 7 of the magnet 1 are cut away on the side 10 which is remote from the spindle of the disc 5 to form a rectangular recess or cut away portion 11. A bridge 12 of magnetic material of L shape is mounted to extend across the poles 7 so that the horizontal limb 12a of the bridge extends into the cut away portion or recess 11 and the vertical limb 12b of the bridge extends down the side faces 10 of the poles 7. This L-shaped bridge 12 is of uniform cross-section. It is separated from the poles 7 by a spacer piece 13 of non-magnetic material, such as brass, which extends into the cut away portion 11. A further spacer strip 14 may be inserted if required between the bridge 12 and the spacer piece 13 in order to modify the resultant characteristic of the electro-magnet 1 as required, and to take account of variations in the materials used and in the current ratings of different meters. The top face of the horizontal limb 11a of the bridge piece 12 is level with the pole faces 7a of the electro-magnet 1. This bridge piece 11 is of such section that at higher loads it becomes saturated.

Usually the core 8 of the series electro-magnet 1 is not so thick as that of the shunt electro-magnet 2 and consequently a spacer piece (not shown) is provided between the said core and the plate 3 on which it is mounted so that the side faces 15 of its poles 7 towards the centre of the disc 5 will be in line with the similar side faces of the poles 6 of the shunt magnet 2.

Since the two electromagnets 1, 2 are both mounted upon the same plate 3, there will be a magnetic connection between them through the plate.

It has been found that an alternating current electrical instrument of the type referred to, when constructed as hereinbefore described, has a better "error/load" curve at the high loads than an instrument having a series magnet arranged in accordance with the above-mentioned construction previously proposed by the applicant. The improved performance of a single-phase watt-hour meter constructed in accordance with the present invention is illustrated by the curves shown in Fig. 4 of the drawings. Fig. 4 illustrations results of a test carried out on such a meter when fitted successively with different arrangements of series electro-magnet. The curves show, to a percentage scale, the error/load characteristic of the meter, curve A being the characteristic of the meter when fitted with a series electro-magnet having no compensation; curve B showing the improvement produced by the arrangement of series electro-magnet according to the applicant's said prior proposal; whilst curve C shows the further improvement effected by an arrangement of series magnet according to the present invention.

It will be seen that curve A begins to fall before full load value is reached, whilst at 400% full load the curve has fallen to over 12% error slow. Curve B shows substantially no deviation from zero error until above 200% full load, but falls thereafter to 6.5% slow at 400% full load. Curve C, however, remains substantially flat to a point beyond 300% full load, and only falls to about 3% error slow at 400% full load. A meter having a series magnet arranged in accordance with the present invention will thus have a high degree of accuracy over all normally encountered ranges of operation. The marked ordinates corresponding to + and − 2% error show the normally accepted limits of accuracy of the meter.

What I claim is:

1. In an alternating current electrical instrument of the kind referred to, a series electro-magnet having the pole faces thereof cut away, a bridge of magnetic material of generally L shape mounted on and extending across the poles and having one limb extending down the exterior side faces of the poles and the other limb extending into the cut away portion of the pole faces, and a spacer piece of non-magnetic material mounted between the bridge and the pole faces of the magnet.

2. In an alternating current electrical instrument of the kind referred to, a series electro-magnet having the pole faces thereof cut away adjacent the sides of said poles of the magnet nearest to the outer edge of the disc of the instrument, a bridge of magnetic material of generally L shape mounted on and extending across the poles and having one limb extending down the side faces of the poles which are nearest to the outer edge of the disc of the instrument, and the other limb extending into the cut away portion of the pole faces, and a spacer piece of non-magnetic material mounted between the bridge and the pole faces of the magnet.

3. For an A. C. eddy current type of instrument an electro-magnet having a U-shaped core with parallel-disposed poles, a magnetic shunt comprising a bridge piece of L shape in cross-section extending between the poles with one limb of the L located adjacent the one sides of the poles and the other limb extending across the pole faces, and a non-magnetic distance piece located between the bridge piece and the magnet core.

EDWARD JOHN RIORDAN.

REFERENCES CITED

The following references are of record in the file of this patent:

UNITED STATES PATENTS

| Number | Name | Date |
|---|---|---|
| 1,750,259 | Callsen | Mar. 11, 1930 |
| 1,826,447 | Beusch | Oct. 6, 1931 |
| 2,132,271 | Pratt | Oct. 4, 1938 |
| 2,162,522 | Barnes | June 13, 1939 |
| 2,169,028 | Leippe | Aug. 8, 1939 |